(12) United States Patent
Schell

(10) Patent No.: US 6,586,705 B1
(45) Date of Patent: Jul. 1, 2003

(54) ANTI-SPATTER TUBE

(75) Inventor: William R. Schell, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/099,237

(22) Filed: Mar. 15, 2002

(51) Int. Cl.[7] .............................................. B23K 26/16
(52) U.S. Cl. ............................ 219/121.67; 219/121.72; 219/121.84
(58) Field of Search ....................... 219/121.67, 121.68, 219/121.69, 121.7, 121.71, 121.72, 121.82, 121.84

(56) References Cited

U.S. PATENT DOCUMENTS

| | | |
|---|---|---|
| 4,532,403 A | 7/1985 | Jordan et al. |
| 4,731,517 A | 3/1988 | Cheney |
| 5,034,592 A * | 7/1991 | Chun .................... 219/121.84 |
| 5,994,667 A | 11/1999 | Merdan et al. |

FOREIGN PATENT DOCUMENTS

| | | | |
|---|---|---|---|
| JP | 5-237679 A | * | 9/1993 |
| JP | 9-155584 A | * | 6/1997 |
| JP | 11-129088 A | * | 5/1999 |
| JP | 11-156588 A | * | 6/1999 |

* cited by examiner

Primary Examiner—Geoffrey S. Evans
(74) Attorney, Agent, or Firm—DiPinto & Shimokaji, P.C.

(57) ABSTRACT

A cutting method and apparatus in a laser trim cell system for cutting ducts and tubes used in an airliner. The ducts are cut along a horizontal cutting plane using an orbiting laser nozzle and the apparatus and method includes an anti-spatter tube for removing spatter from the interior of the duct by directing the spatter through an opening in the tube where it impinges a high thermal conductivity plate that deflects it to the bottom of the tube where it solidifies by contact on a surface of high thermal conductivity for easy removal from the tube.

20 Claims, 3 Drawing Sheets

ANTI-SPATTER TUBE

BACKGROUND OF THE INVENTION

This invention relates to a tube and method for controlling and removing molten spatter generated during a cutting process without introducing unwanted contaminants on the cut product.

During aircraft manufacture, a Laser Trim Cell (LTC) system trims duct assembly details to a net length in preparation for fusion weldment. These cut tubes are assembled to create various duct assemblies used on commercial aircraft, e.g., for distributing engine bleed air, thermal anti-ice heat air flow, air conditioning flow and the like.

Control of molten spatter, or molten metal, generated during the cut operations, is required to prevent damage to the duct or tube. The design of the LTC orbits the laser cutting head, in a planar motion, around the stationary tube or duct. As the material is melted, a molten plume of spatter is ejected towards the inside wall of the duct or tube. Without a method or apparatus to control and manage the spatter, it will impact and melt and resolidify and adhere to the internal tube or duct surface. The results would not be acceptable for production use, as this would require significant rework to remove the spatter.

A common method of controlling spatter during laser cutting operations is to coat the surfaces needing protection with an anti-spatter compound. This typically involves the use of low viscosity mineral oil. However, this defeats the purpose of the LTC system, which is to provide cuts "ready for weld" with no requirement for manual solvent or tankline cleaning. All tube details are put through cleanline tanks prior to cutting following the tube or duct forming operations. The use of an anti-spatter compound would require post cleaning to meet fusion weld specification requirements. In addition, as these compounds are heated and vaporized, irritating and potentially hazardous fumes are created.

Methods and apparatus for preventing spatter have also been reported in prior publications, such as U.S. Pat. Nos. 4,532,403 and 5,994,667.

U.S. Pat. No. 4,532,403 describes a method of coating the inside of a tube to be welded with a uniform layer of a surfactant that prevents laser burn through or laser weld spatter adhesion to the inside of the tube. Post-weld cleaning, as with the manual solvent method discussed above, is required and is undesirable.

U.S. Pat. No. 5,994,667 describes a mechanical method of preventing spatter adhesion in a cut tube by including a wire or mandrel of circular or angular cross-section that is positioned inside of the tube. The wire or mandrel can be moved during the cutting operation so that a new spatter accumulating surface is sequentially exposed to the laser. A fluid or gaseous coolant can also be used to cool and carry away the spatter or molten metal accumulated on the wire or mandrel. However, the device in this patent does not deflect the spatter for accumulation away from the cut tube and does not use a material such as disclosed in the present invention to chill the molten metal or spatter quickly so that it will fall out of the way where it can be accumulated and the apparatus of the invention can be reused.

SUMMARY OF THE INVENTION

Accordingly, it is an aspect of the invention to provide an anti-spatter tube for deflecting and accumulating molten metal or spatter that is created during a laser cutting operation being performed on the outer surface of a tube or duct which is placed in surrounding relation to the anti-spatter tube. The anti-spatter tube is made of copper and mounted on a mandrel inside the tube being cut, at the cut line, with its longitudinal axis perpendicular to the laser-cutting beam. An elliptical hole is cut in the side of the anti-spatter tube, and is rotated tracking the cutting laser head as it rotates around the duct or tube being cut during the cutting cycle to permit entry of spatter generated during the cutting cycle into the interior of the anti-spatter tube. A deflector plate mounted within the interior of the anti-spatter tube at an angle to the horizontal cutting plane directs the molten plume of metal or spatter down and away from the cutting plane and cutting operation. Copper is used as the anti-spatter tube material because it can withstand the heat of the molten plume, and its high thermal conductivity cools and solidifies droplets before they can stick to it. Any buildup of solidified material that does occur in the tube can easily be removed. The tube can be made to fit different diameter ducts being cut, and is self-aligning on the mandrel or post when mounted on the laser cutting center axis alignment post.

Another aspect of the invention is to provide a rotatable central post; a laser cutting nozzle orbiting the post adapted to cut a duct along a cutting plane generally perpendicular to the post which generates a plume of molten metal or spatter on the inner surface of the cut duct; a tube mounted on the central post concentric to the tube being cut for removing any spatter generated by cutting the duct; the tube having an opening which is elliptical in shape positioned in the cutting plane of the nozzle tracking and facing the nozzle as it orbits the duct and a deflector plate positioned at an angle to the cutting plane extending from a position adjacent to the top of the interior wall of the tube to the bottom of the interior wall for directing spatter to the bottom of the tube which has a bottom wall for collecting solidified spatter directed to it by the deflector plate.

Yet another aspect of the invention is the provision of an anti-spatter tube for use in a cutting process for preventing the build-up of spatter in the interior of a cut duct including an opening in the wall of the tube adapted to be positioned inside the duct in the cutting plane of a cutting nozzle, tracking and facing the nozzle as it orbits about the duct being cut; a deflector plate positioned at an angle to the cutting plane extending from the top of the interior wall of the tube to the bottom of the interior wall for directing spatter to the bottom wall of the tube where solidified spatter can be collected.

In a still further aspect of the invention, a method is provided for the removal of spatter or molten metal during a laser cutting operation by positioning an anti-spatter tube within a tube being cut, collecting spatter within the interior of the tube and deflecting the spatter to the bottom of the tube where it is cooled away from the cutting operation and solidified and easily removed without the use of potential chemical contaminants which have to be removed prior to and which would interfere with weldment of the cut tube.

These and other features, aspects and advantages of the present invention will become better understood with reference to the following drawings, description and claims.

DETAILED DESCRIPTION OF THE INVENTION

The following detailed description is the best currently contemplated modes for carrying out the invention. The description is not taken in a limiting sense, but is made merely for the purpose of illustrating the general principles of the invention.

Figure 1:
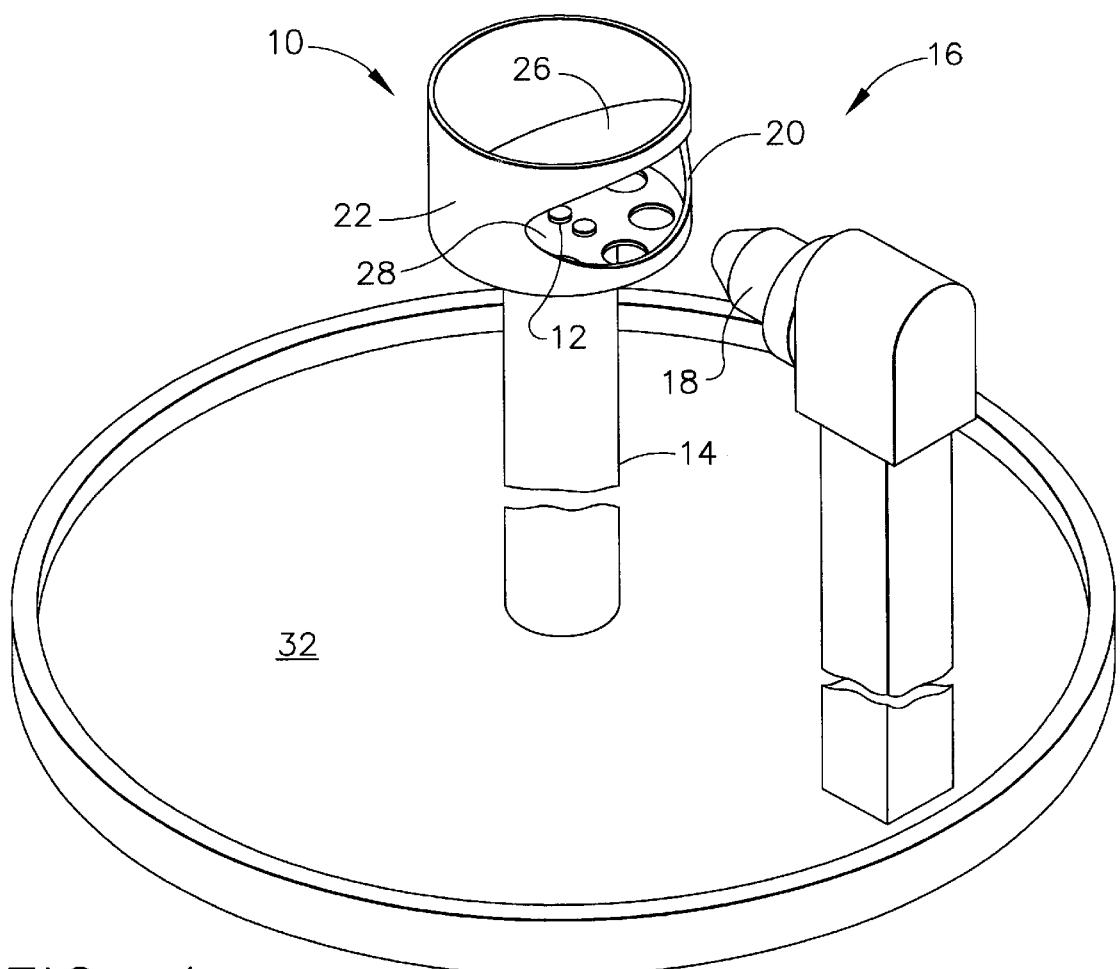
FIG. 1 is a perspective view of the anti-spatter tube of the present invention positioned for cutting.
Figure 2:
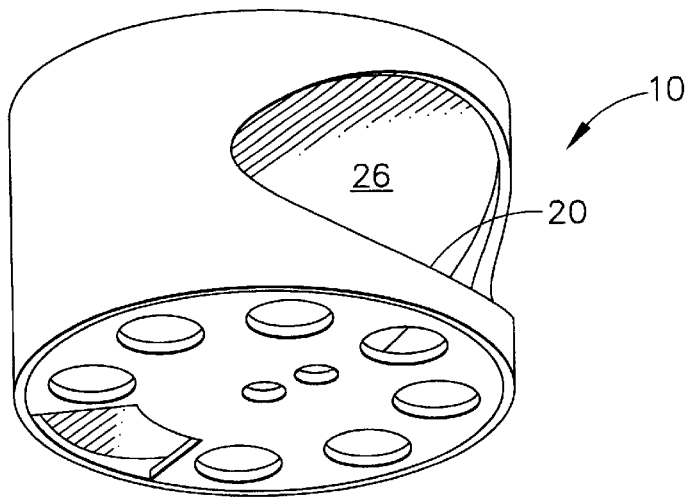
FIG. 2 is a front perspective view of the anti-spatter tube of the present invention.
Figure 3:
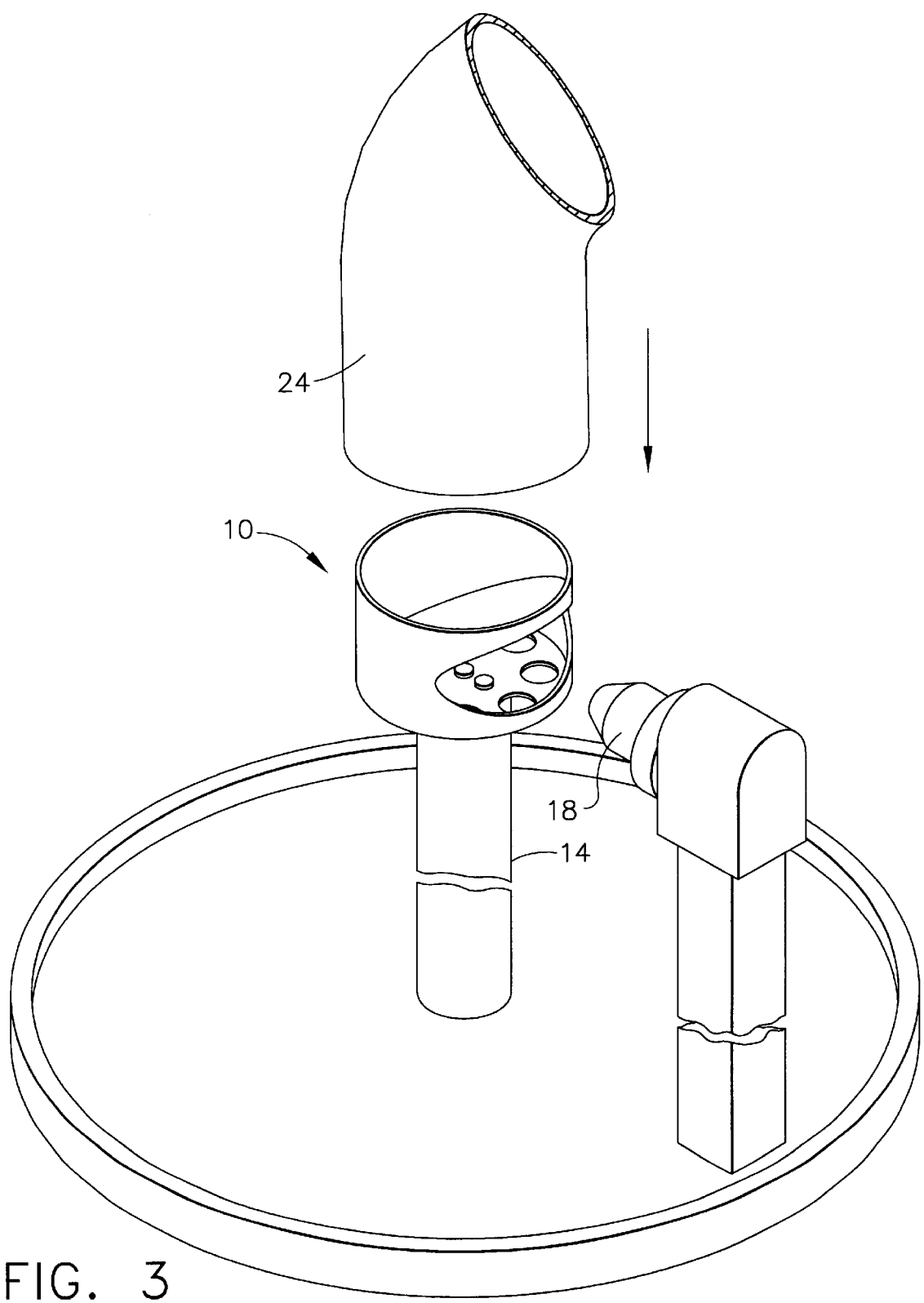
FIG.3 is a view similar to FIG. 1 illustrating a tube or duct to be cut over the anti-spatter tube.
Figure 6:
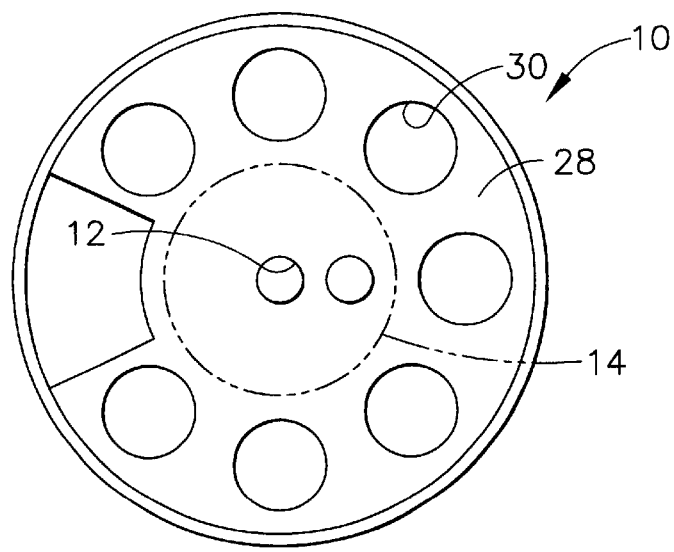
FIG. 6 is a bottom plan view of the anti-spatter tube of FIG.4.

Referring now to the drawings in detail, wherein like numerals indicate like elements throughout the several views, and in particular to FIGS. 1, 3 and 6, a cylindrical anti-spatter tube 10, having a central aperture12 formed in a bottom wall or surface 28 may be received on a center alignment post 14 inserted through aperture 12 of a Laser Trim Cell apparatus 16. The anti-spatter tube 10 may be press fit onto top of post 14 or held in place on post 14 by a keyway or alignment pins or the like. The Laser Trim Cell apparatus 16 is used primarily in the cutting of ducts which may be welded together in appropriate lengths or at various angles to manufacture environmental control system, fuel transfer and hydraulic lines used in a commercial airliner, while the anti-spatter tube is unique in precluding the necessity of post cutting cleaning of the cut surface prior to weldment and the ability of reuse as spatter is solidified and easily removed from the tube.

The center alignment post 14 and cylindrical anti-spatter tube 10 may rotate about a longitudinal axis perpendicular to and in timed relation to the orbital plane of a laser cutting head nozzle18 so that an elliptical opening 20 formed in the side wall 22 of tube 10 will always face the laser cutting head nozzle 18 during the cutting process. The elliptical opening 20 may thus always track opposite the laser cutting head nozzle 18, and is positioned so that the center of elliptical opening 20 is in the plane of the cutting line of the laser cutting head nozzle 18.

As indicated in FIG.3, a duct or tube 24 to be cut and welded along its cut line may be positioned concentrically over the cylindrical anti-spatter tube 10 by the Laser Trim Cell apparatus 16 at the cut line of the laser cutting head nozzle 18.

Figure 4:
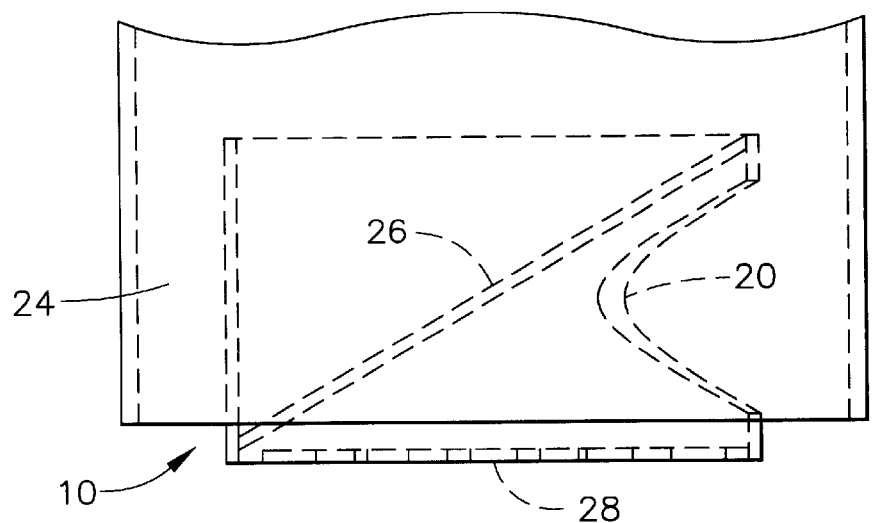
FIG. 4 is a side view of the anti-spatter tube and duct to be cut illustrated in FIG. 3.
Figure 5:
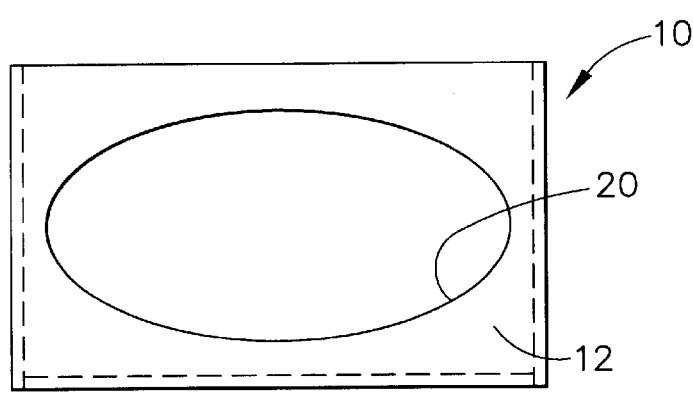
FIG. 5 is a side view in elevation of the anti-spatter tube of FIG. 4.

As the material of the duct or tube 24 is melted during the cutting process depicted in FIG. 3, a molten plume of spatter is ejected towards the inside wall of the duct or tube 24. Without some method or apparatus to control and manage the spatter, it will impact and melt or adhere to the internal duct surface, requiring further production removal. However, a deflector plate 26 may be mounted inside the cylindrical anti-spatter tube 10, which is generally open at its top, and is angled downwardly from the top of the interior wall of the cylindrical anti-spatter tube 10 past the elliptical opening 20 and terminates at the bottom of the interior wall, as shown in FIG.4, so that the molten plume of metal or spatter may be directed down and away from the cutting plane to the bottom wall or surface 28 of the cylindrical anti-spatter tube 10.

The cylindrical anti-spatter tube 10 may be preferably formed from copper, which can withstand the heat of the molten plume, and its high thermal conductivity cools and solidifies the droplets before they can stick to the bottom wall or surface 28. The bottom wall or surface 28 has a series of openings 30 to allow solidified spatter to fall into catch basin 32 on the Laser Trim Cell apparatus 16. Any buildup of solidified spatter on bottom wall or surface 28 can thus be easily removed and the cylindrical anti-spatter tube 10 reused extending its service life. Alternatively, the spatter may fall through the series of openings 30, and if so, will not impinge on the duct or tube 24 being cut or cylindrical anti-spatter tube 10. The absence of spatter around the cut line of duct or tube 24 or the use of a chemical agent to remove the same, may negate the need for post cutting cleaning. The method employed to remove the spatter simply comprises positioning the cylindrical anti-spatter tube 10 within the duct or tube 24 being cut, collecting spatter within the interior of the cylindrical anti-spatter tube 10 and deflecting the spatter to the bottom wall or surface 28 of the cylindrical anti-spatter tube 10 by hitting deflector plate 26, wherein it may be cooled and solidified and easily removed.

A series of cylindrical anti-spatter tubes 10, in varying diameters approximating the diameter of the duct to be cut, may be provided to cover the range of production duct diameters. Each cylindrical anti-spatter tube 10 is readily positioned on the LTC's (Laser Trim Cell) center axis/alignment post and self aligns with the laser cutting head nozzle 18.

While the principles of the invention have been made clear in the illustrative embodiment, it will be obvious to those skilled in the art that many modifications of structure, arrangement, materials and components used in the practice of the invention can be made, without departing from the principles of the invention. The appended claims are intended to cover and embrace any and all such modifications, with the limits only of the true purview, spirit and scope of the invention.

We claim:

1. Cutting apparatus comprising:
   a rotatable central post,
   a laser cutting nozzle adapted to cut a duct along a cutting plane generally perpendicular to said post orbiting said post and generating a plume of molten metal or spatter on the inner surface of the cut tube,
   a tube mounted on said central post concentric to said duct being cut for removing any spatter generated by cutting the duct, said tube including:
      an opening positioned in the cutting plane of said nozzle tracking and facing said nozzle as it orbits about said duct, and
      a deflector plate positioned at an angle to said cutting plane extending from a position adjacent the top of the interior wall of said tube to the bottom of said interior wall for directing spatter to the bottom of said tube, and
      a bottom wall on said tube for collecting solidified spatter directed to it by said deflector plate.

2. The cutting apparatus of claim 1 wherein said tube is made from copper.

3. The cutting apparatus of claim 1 wherein the opening in said tube is elliptical in shape.

4. The cutting apparatus of claim 1 wherein said tube includes a bottom wall having a plurality of openings formed therein.

5. The cutting apparatus of claim 1 wherein said bottom wall includes a central opening for receipt of said central alignment post.

6. Cutting apparatus comprising:

a rotatable central post, a laser cutting nozzle adapted to cut a duct along a cutting plane generally perpendicular to said post orbiting said post and generating a plume of molten metal or spatter on the inner surface of the cut duct, a tube mounted on said central post concentric to said duct being cut for removing any spatter generated by cutting the duct, said tube including:

an opening positioned in the cutting plane of said nozzle tracking and facing said nozzle as it orbits about said duct, a deflector plate positioned at an angle to said cutting plane extending from a position adjacent the top of the interior wall of said tube to the bottom of said interior wall for directing spatter to the bottom of said tube, and a bottom wall on said tube for collecting solidified spatter directed to it by said deflector plate, and the opening in said tube being elliptical in shape.

7. Cutting apparatus in accordance with claim 6 wherein said tube is made from copper.

8. Cutting apparatus in accordance with claim 7 wherein said tube includes a bottom wall having a plurality of openings formed therein.

9. Cutting apparatus in accordance with claim 8 wherein said bottom wall includes a central opening for receipt of said central alignment post.

10. Cutting apparatus comprising:

a rotatable central post, a laser cutting nozzle adapted to cut a duct along a cutting plane generally perpendicular to said post orbiting said post and generating a plume of molten metal or spatter on the inner surface of the cut tube, a tube mounted on said central post concentric to said duct being cut for removing any spatter generated by cutting the duct, said tube including an opening positioned in the cutting plane of said nozzle tracking and facing said nozzle as it orbits about said duct, a deflector plate positioned at an angle to said cutting plane extending from a position adjacent the top of the interior wall of said tube to the bottom of said interior wall for directing spatter to the bottom of said tube, a bottom wall on said tube for collecting solidified spatter directed to it by said deflector plate, and said bottom wall including a plurality of openings formed therein.

11. The cutting apparatus of claim 10 wherein said bottom wall includes a central opening for receipt of said central alignment post.

12. An anti-spatter tube for use in a cutting process for preventing the buildup of spatter or molten metal on the interior of a cut duct comprising:

an opening in a tube wall adapted to be positioned inside said duct in the cutting plane of a cutting nozzle tracking and facing said nozzle as it orbits about said duct, and a deflector plate positioned at an angle to said cutting plane extending from a position adjacent the top of the interior wall of said tube to the bottom of said interior wall for directing spatter to the bottom of said tube, and a bottom wall on said tube for collecting solidified spatter directed to it by said deflector plate.

13. The tube of claim 12 wherein said tube is made of copper.

14. The tube of claim 12 wherein the opening in said tube is elliptical in shape.

15. The tube of claim 12 wherein said tube includes a bottom wall having a plurality of openings formed therein.

16. The tube of claim 12 wherein said bottom wall includes central opening for receipt of said central alignment post.

17. A cutting method using an orbiting laser nozzle for cutting a duct along a horizontal cutting plane comprising the steps of:

removing spatter from the interior of said duct formed adjacent the cutting plane of said nozzle by collecting spatter within the interior of a tube concentrically positioned within said duct, and deflecting said spatter away from said cutting plane to the bottom of said tube where it solidifies for easy removal.

18. The cutting method of claim 17 wherein said solidification step includes:

contacting said spatter with a surface of high thermal conductivity to rapidly cool said spatter.

19. The cutting method of claim 17 wherein said removal step includes partially removing said solidified spatter through the bottom wall of said collection tube.

20. The cutting method of claim 17 wherein said solidification step includes contacting said spatter with a surface of high thermal conductivity to rapidly cool said spatter.

* * * * *